United States Patent [19]

Kaczmarek et al.

[11] Patent Number: 4,972,456
[45] Date of Patent: Nov. 20, 1990

[54] RURAL RADIOTELEPHONE SYSTEM

[75] Inventors: Keith W. Kaczmarek, The Woodlands, Tex.; Harold G. Saroka, Winfield, Ill.

[73] Assignee: GTE Mobilnet Incorporated, Houston, Tex.

[21] Appl. No.: 308,496

[22] Filed: Feb. 10, 1989

[51] Int. Cl.$^5$ .............................................. H04B 00/00
[52] U.S. Cl. ........................................ 379/59; 379/60; 455/33
[58] Field of Search ........................ 379/57, 63, 59, 60, 379/58; 455/33, 11, 20, 21

[56] References Cited

U.S. PATENT DOCUMENTS

| | | | |
|---|---|---|---|
| 4,539,706 | 9/1985 | Mears et al. | 455/11 |
| 4,727,590 | 2/1988 | Kawaro et al. | 455/33 |
| 4,759,051 | 7/1988 | Han | 379/59 |

OTHER PUBLICATIONS

Seki et al., "Detachable Unit Service in 800 MHz Band Cellular Radiotelephone System", *IEEE Communications,* 2/86, vol. 24, No. 2, pp. 47–52.

*Primary Examiner*—James L. Dwyer
*Assistant Examiner*—Magdy W. Shehata

[57] ABSTRACT

A remote coverage system extends the effective coverage area of a cellular mobile radiotelecommunications (CMR) master cell. When a mobile unit assigned to the master cell moves from the master cell's coverage area into the coverage area of a satellite cell, the satellite cell sends a signal asking for a handoff of the mobile unit to it. When the handoff occurs, the MTSO exchanges signals with the mobile unit via a relay unit located at the master cell site. The relay unit relays signals between the MTSO and the satellite cell.

3 Claims, 3 Drawing Sheets

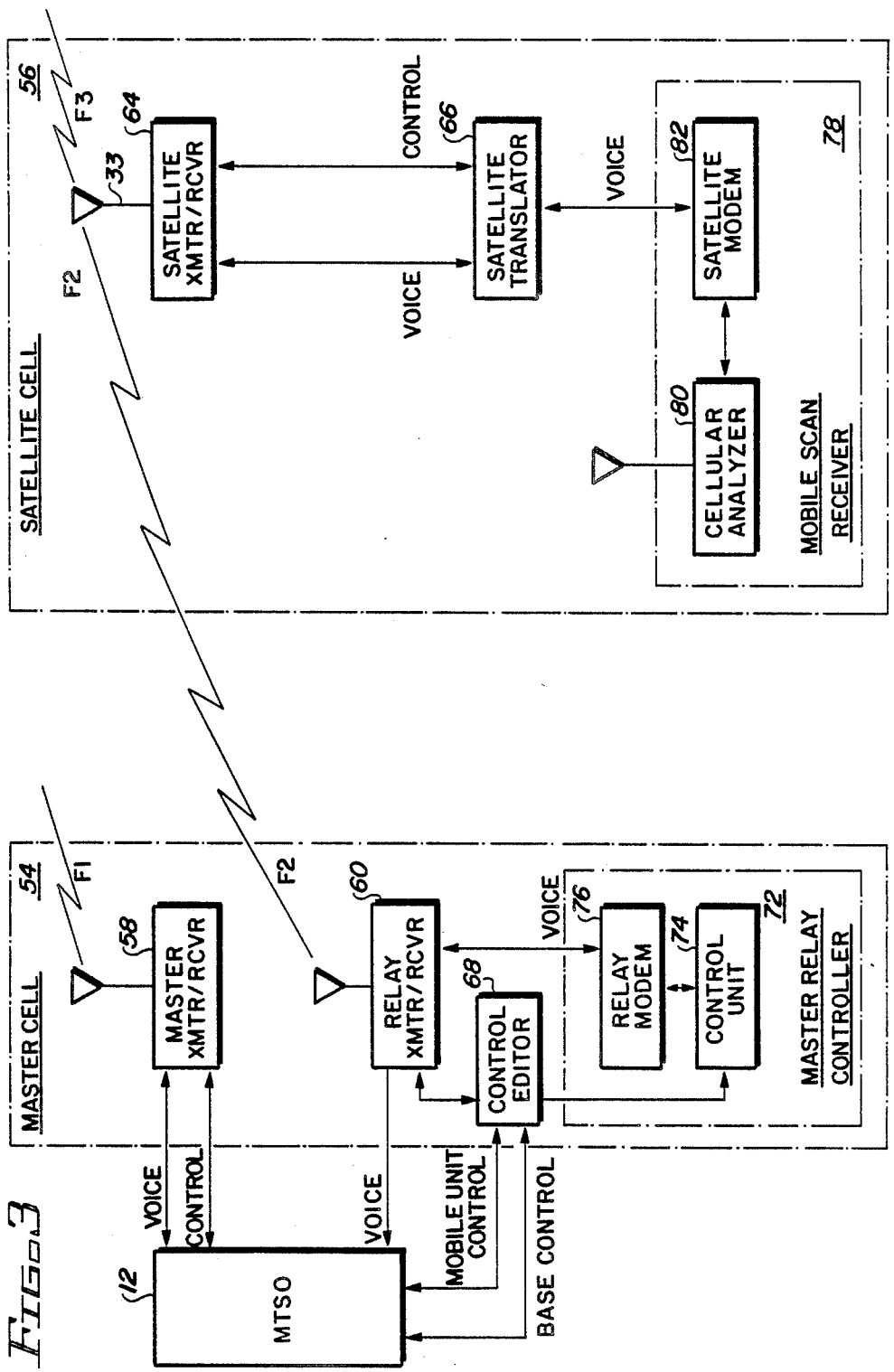

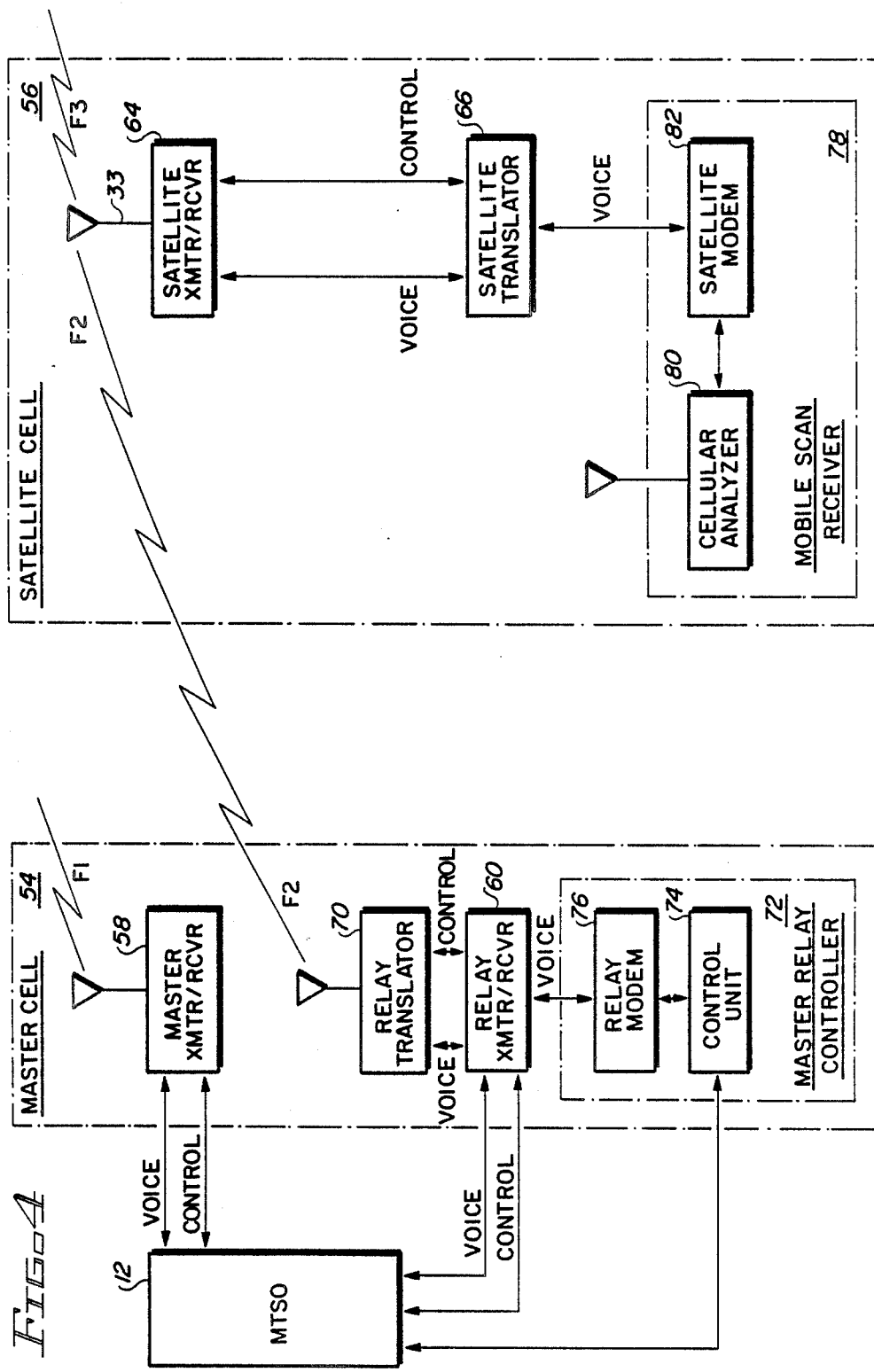

RURAL RADIOTELEPHONE SYSTEM

BACKGROUND OF THE INVENTION

This invention relates to cellular mobile radiotelephone (CMR) technology. More particularly, this invention relates to the expansion of the coverage area of a given cell site.

CMR service is a rapidly growing telecommunication system. The technology underlying CMR service is exhaustively documented and well within the understanding of those possessed of ordinary skill in the art. Accordingly, a rigorous description of CMR technology will not be undertaken here.

Telephone Linked to MTSO

The workings of the present invention will be more readily understood with the aid of a brief description of the sequence of events in the placing of a CMR telephone call.

FIGS. 1 and 2 show a typical automobile cellular telephone unit 2 having a unique mobile identification number (MID) stored in a suitable location such as an electrically eraseable programmable read-only memory (EEPROM, not shown). Telephone units of this kind are well known in the art and are described here only in sufficient detail to aid understanding the invention.

The telephone unit 2 includes a handset 4 having a keypad 5; equivalently, the keypad 5 could be located separately from the handset. Also included in the telephone unit 2 are a speaker 6 and a microphone 7, shown as being mounted within the handset 4 but either or both of which could equivalently be mounted apart from the handset, either separately (e.g., in a telephone operator's headset or in wall mountings), or approximately together (e.g., in a walkie-talkie or speakerphone configuration). It will be apparent to those of ordinary skill that if the keypad 5, the speaker 6, and the microphone 7 are all located apart from the handset 4, the handset can be dispensed with.

A transceiver 8, ordinary built into the telephone unit 2, exchanges signals (via, e.g., an antenna 10) with a mobile telecommunications switching office or MTSO 12, typically via radiotelephone signals relayed by one of several cell sites 11 that are in turn connected with the MTSO 12 via a landline. The MTSO 12 is ordinarily connected with a telephone company switching unit 12a via a high-capacity landline or similar connection.

Telephone Logic Circuitry

The operation of the telephone unit 2 is controlled by logic circuitry 14. The logic circuitry 14 may be implemented in the form of, e.g., a microprocessor which executes program statements stored in a storage device such as a read-only memory, or equivalently by discrete logic components or one or more custom semiconductor chips.

Those of ordinary skill will appreciate that a sequence of numbers to be dialed by the telephone unit 2 is processed by the logic circuitry 14 generally as follows. Under control of the logic circuitry 14, the transceiver 8 transmits a cellular control signal to a cell site 11 over a signalling channel to initiate channel set up. The control signal includes a request that the MTSO 12 dial a specified telephone number and assign a voice frequency or channel for use by the telephone unit 2.

The telephone unit 2 includes a read-write memory 16, accessible to the user and whose contents will not be affected by telephone power-downs of ordinary duration For example, the memory 16 may equivalently comprise an EEPROM programmable by the user, a CMOS memory chip, or a conventional RAM with an independent power supply, any of which may possibly be implemented as part of a custom semiconductor chip.

It will be understood that telephones used in typical cellular systems are capable of generating both dual tone multi-frequency (DTMF) signals (DTMF signals produced by Bell telephones are referred to by the "Touch-Tone" trademark) and EIA standard IS-3-D cellular control signals

Transition Between Coverage Areas

When a mobile telephone unit 2 reaches the boundary between the coverage areas of two cells 11, a hand off must be performed to transfer the RF communications link from the current cell to a new cell.

Conventionally, a hand off is initiated when the signal strength of a mobile telephone unit 2, as received at the current cell 11, drops below a set threshold. When the current cell 11 detects this weakness in the signal of the mobile unit 2, it requests the MTSO 12 to assign the mobile unit 2 to the voice channel of a new cell 11.

The MTSO 12 responds by ascertaining which neighboring cell 11, if any, now has the mobile unit 2 within its coverage area. It does so by broadcasting a "please listen for" control signal to all neighboring cells 11, requesting that the neighbor cells report whether the signal of the mobile unit 2 is being received above a threshold strength. The MTSO 12 selects a new cell from the neighboring cells 11 that so report, if any.

Having selected a new cell 11 for the mobile unit 2, the MTSO sends out a control signal on the voice channel of the current cell 11, directing the mobile unit 2 to retune to the voice channel of the new cell 11. In response, the mobile unit 2 (under control of its logic circuitry 14) retunes to the indicated frequency; the MTSO 12 routes the voice signals that are intended for the mobile unit 2 through the new cell 11 instead of the former current cell 11; and the hand off is thus complete.

The MTSO's instruction to the mobile unit 2 to retune is transmitted over the voice channel of the current cell 11 in a "blank and burst" sequence, namely: turning off the audio of the mobile unit 2; transmitting the instruction; waiting for the mobile unit 2 to retune; and turning its audio back on. This brief cancellation of the audio channel produces a "click" noise which can be heard by the subscriber.

Difficulties of Providing Coverage in Remote Areas

To provide CMR service in a new area generally involves the construction of a new, fully equipped cell site 11. The cost of constructing such a facility is increased by the cost of a new dedicated landline and the associated facilities cost, or interconnect cost between a cell and an MTSO 12. In rural service areas where traffic (and thus usage) is low, this cost becomes prohibitive.

Systems are known which provide relay cells which extend the coverage area of an existing cell site and MTSO link by translating the frequency of a channel, or RF communications link, and rebroadcasting from the relay cell at a new frequency. This is typically done on a channel by channel basis in which individual channels are translated as they are received. This requires one channel for every channel that is to be translated and repeated. The implementation of such a system is complex and expensive.

SUMMARY OF THE INVENTION

A remote coverage system serves to extend the effective coverage area of a CMR master cell via which a mobile telecommunications switching office (MTSO) exchanges signals, e.g., on an F2 frequency set, with a radiotelephone mobile unit.

A satellite transceiver at a satellite cell has a coverage area encompassing the location of the mobile unit. The satellite transceiver is configured to receive inbound signals transmitted by the mobile unit on the F3 frequency set, and likewise to broadcast outbound signals to the mobile unit on the F3 frequency set.

A satellite translator is configured to translate, e.g., to an F3 frequency set, all inbound signals received by the satellite transceiver from the master cell on the F2 frequency set and thereby cause the rebroadcasting of the signals on the F3 frequency set.

A master relay transceiver is located at the site of the master cell and is configured to transmit and receive signals to and from the satellite transceiver on the F2 frequency set. A master translator is located at the site of the master cell and is configured to translate signals of communication between the MTSO and the master relay transceiver.

BRIEF DESCRIPTION OF THE DRAWINGS

FIGS. 3 and 4 are block diagrams of systems implementing the present invention.

Throughout the following detailed description, similar reference numerals refer to similar elements in all Figures of the drawings.

DETAILED DESCRIPTION OF SPECIFIC EMBODIMENTS

Figure 1:
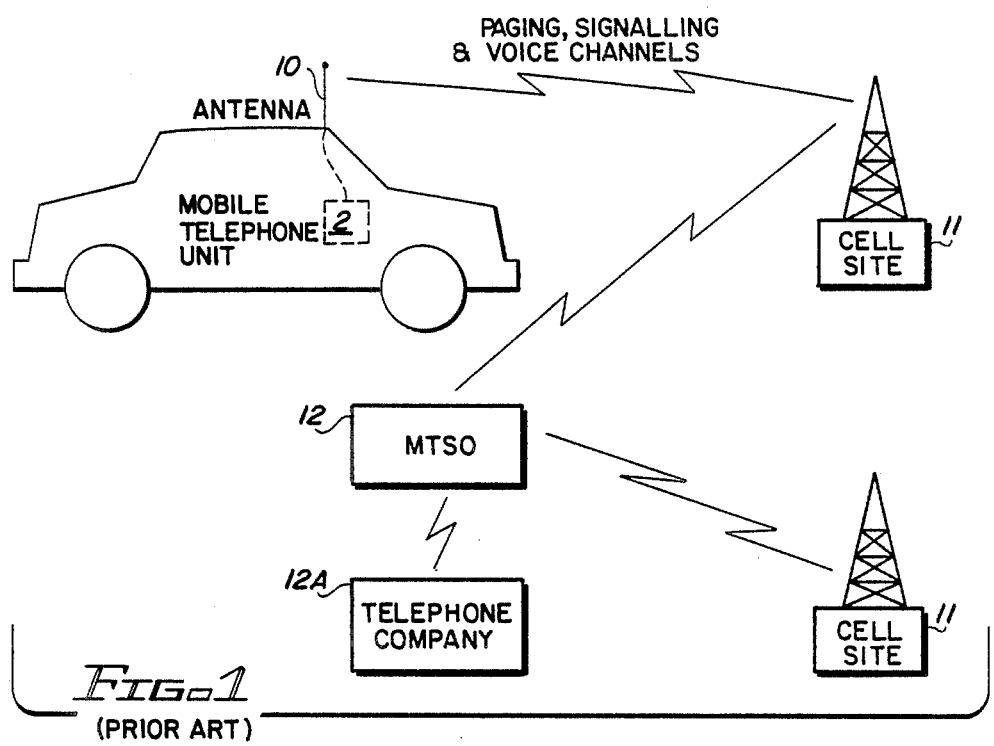
FIG. 1 is block diagram of a typical mobile cellular telephone and its link with a fixed switching unit.
Figure 2:
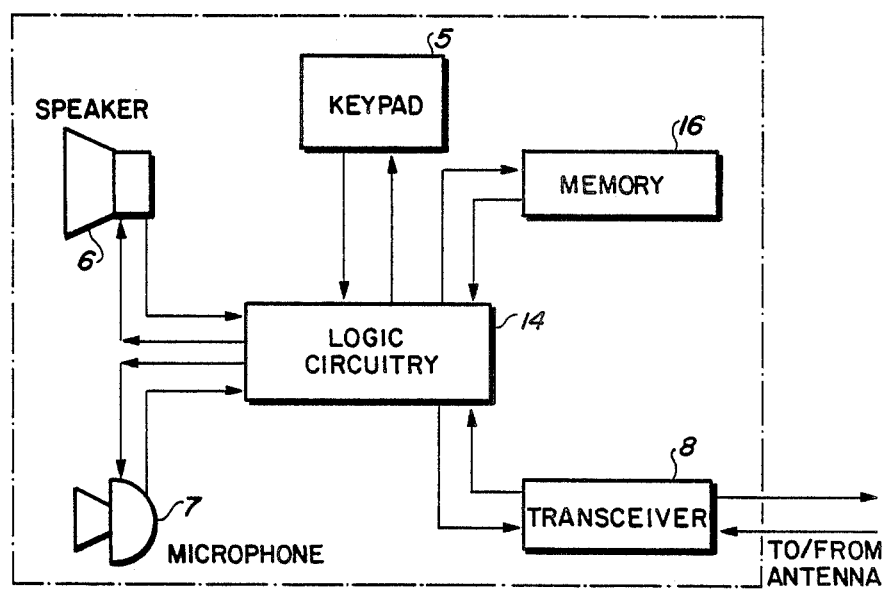
FIG. 2 is a block diagram of some components of such a telephone.

An illustrative implementation of a microprocessor-based telephone system in accordance with the invention is presented here. The illustration uses an automobile cellular phone as an example, but it will be understood by those of ordinary skill that the invention can be implemented in virtually any telecommunications system.

It will be understood by those of ordinary skill having the benefit of this disclosure that the specific details of any given implementation may vary considerably. The selection of components and the arrangement and programming thereof will be a matter of choice by the artisan for the particular application desired.

Master Cell, Relay Unit, and Satellite Cell

FIG. 3 shows a system diagram of one embodiment of the present invention. The system includes a master cell 54 and a satellite cell 56.

The master cell 54 contains a conventional set of cell site equipment for servicing its own coverage area, including conventional components to perform the functions of a transmitter and a receiver (referred to collectively for convenience as a transceiver) such as a master transceiver 58. The master transceiver 58 operates on a set of channels F1; for purposes of illustration, assume that the channel set F1 includes a signalling channel arbitrarily designated as channel 335 and a voice channel designated as 340.

A relay transceiver 60 is also included in the master cell. The relay transceiver 60 is similar to the master transceiver 58. Assume for purposes of illustration that the relay transceiver 60 operates on a set of signalling and voice channels F2, including a signalling channel designated as 365 and a voice channel designated as 370.

The satellite cell 56 includes a satellite transceiver 64. Assume for illustrative purposes that the satellite transceiver 64 operates on a set of signalling and voice channels F3 that includes a signalling channel designated as 385 and a voice channel designated as 390, and, like the relay transceiver 60, can also send and receive signalling and voice signals on the F2 channels 365 and 370.

The satellite cell 56 additionally includes a satellite translator 66. The satellite translator 66 receives as input the signals on the F2 channels that are received by the satellite transceiver 64; it processes that input to generate essentially identical signals for rebroadcast, e.g., by the satellite transceiver 64, on the F3 channels. (Alternatively, of course, two separate transmitter and receiver combinations could be used in place of the satellite transceiver 64, one to receive and transmit on each of the F2 and F3 frequency sets, with the F2 receiver linked by the satellite translator 66 to the F3 transmitter and vice versa.)

For purposes of illustration, the frequency sets F1, F2, and F3 are assumed to be subsets of and located within the spectrum of the cellular (e.g., the B) frequencies assigned by the FCC to wireline telephone communication companies. It will be appreciated that the present invention is suitable for applications using many other frequency spectrums.

Basic Operation

Generally speaking, the satellite cell 56 extends the coverage area of the master cell 54 by receiving signals within the F2 channel set from the master cell 54's relay transceiver 60 and rebroadcasting those signals to a mobile unit 2 on channels within the F3 set, and vice versa. The master cell 54 and the satellite cell 56 can be configured to perform this operation in several different ways. Some of these ways are explained here by describing various modes of operation of the cells.

Call Initiation Within Satellite Coverage Area

FIG. 3 shows a first embodiment of the system. Consider the case in which the user of a mobile unit 2, located within the coverage area of the satellite cell 56, initiates a CMR telephone call (as described in the Background section).

In a first embodiment, assume that the mobile unit 2 has locked onto the F3 signalling channel 385; it transmits its request for a voice channel on this signalling channel. The request is received on the F3 signalling channel 385 by the satellite transceiver 64, translated by a broad-band satellite translator 66, and rebroadcast inbound to the relay transceiver 60 on the F2 signalling channel 365 by the satellite transceiver 64. The relay transceiver 60 then relays the request to the MTSO 12.

The MTSO 12, however, having received the request on the F2 signalling channel 365, typically responds by assigning an F2 voice channel (e.g., voice channel 350), which is serviced by the master cell 54) to the mobile unit 2 and by sending the mobile unit 2 a tune-in signal directing the to tune to the assigned voice channel.

By hypothesis, the mobile unit 2 is in the coverage area of the satellite cell 56, not the master cell 54. Accordingly, a control editor 68 edits the contents of the tune-in signal so that it directs the mobile unit 2 to tune into an F3 voice channel (e.g., voice channel 390), which is serviced by the satellite cell 56, in whose coverage area the mobile unit 2 presently is found.

The control editor 68 may take the form of a suitably programmed microprocessor, hardwired logic circuitry, or other convenient form. The control editor 68 is shown as being located within the master cell 54, but it will be apparent to those of ordinary skill (having the benefit of this disclosure) that the control editor 68 could equivalently be located within the MTSO 12 or elsewhere, so long as the tune-in signal is appropriately edited.

Subsequently, transmissions from the MTSO 12 that are directed to the mobile unit 2 (on what the MTSO thinks is an F2 channel) are relayed to the satellite transceiver 64 via the relay transceiver 60 on an F2 channel. The satellite transceiver 64 feeds the F2 signal received to the satellite translator 66, which translates the signal to the F3 channel for rebroadcast.

In a second embodiment, illustrated in FIG. 4, the relay transceiver 60 actually operates, not on the F2 channels, but on the F3 channels, just as though it were the satellite transceiver 64.

In particular, when the relay transceiver 60 generates a signal for transmission out of its antenna (e.g., a tune-in signal for the mobile unit 2), a broad-band relay translator 70, interposed between the relay transceiver 60 and its antenna (e.g., prior to power amplification of the signal), monitors the signal generated for the F3 channels by the relay transceiver 60 and generates a substantially identical substitute signal on an F2 channel The substitute signal is transmitted on the F2 channel to the satellite cell 56 in lieu of the original signal that was generated by the relay transceiver 60.

Likewise, when a signal from the mobile unit 2 is relayed on the F2 channel to the relay transceiver 60's antenna by the satellite cell 56, the relay translator 70 similarly translates the signal to the F3 channels and feeds it to the relay transceiver 60 for further transmission back to the MTSO 12.

In a third embodiment, referring again to FIG. 3, the relay transceiver 60 is assumed to be tuneable in response to base control signals from the MTSO 12 The translation function performed by the relay translator 70 is instead performed by the control editor 68, which edits the base control signals. Thus, the MTSO 12 may generate a base control signal that directs the relay transceiver 60 to tune to an F3 channel set, but the relay transceiver 60 tunes instead to an F2 channel set in response to the edited base control signal.

It will be apparent to those of ordinary skill (who have the benefit of this disclosure) that the satellite translator 66 and satellite transceiver 64 may likewise take various forms and arrangements in a similar manner to the relay translator 70 and relay transceiver 60.

Hand Off Between Master and Satellite

The situation will now be discussed in which a call is taking place within the coverage area of the master cell 54, but the mobile unit 2 moves into the coverage area of the satellite cell 56, or vice versa.

For dealing with this situation, the master cell 54 includes a master relay controller 72 comprising a control unit 74 and a facilities link such as a relay modem 76. The master relay controller 72 serves as a coordinator between the MTSO 12 and the satellite cell 56, which it will be noted is not in direct communication with the MTSO 12.

The control unit 74 may be a suitably programmed microcomputer, e.g., a Compaq 286 DeskPro, that is connected to exchange signals with the MTSO 12, e.g., through a conventional RS-232 serial port. The relay modem 76 may be a conventional modem, e.g., a 1200 bits per second (bps) modem. It also communicates with the control unit 74 (e.g., through another serial port), and is adapted in a conventional manner to communicate with the satellite cell 56, e.g., over an F2 voice channel or over a conventional landline.

The satellite cell 56 includes a scan receiver 78 which detects mobile units entering the service area of the satellite cell 56 and alerts the master relay controller 72 to that fact. The scan receiver 78 comprises a cellular analyzer 80 and a satellite modem 82.

The cellular analyzer 80 may be implemented using an EF Johnson Cellular System Analyzer, model #250-1160-800. Alternatively, the cellular analyzer 80 may be implemented using a modified mobile unit, a spectrum analyzer, a cellular radio, etc. The cellular analyzer 80 scans the possible frequencies from mobile units that could be arriving into the service area of the satellite cell 56. These frequencies will usually be those of the master cell 54 (or other cells surrounding the master cell 54); it will often be convenient to program the frequencies into a suitable table in memory or other storage, so that the frequency scanning process can be done in a conventional table-lookup fashion.

If the cellular analyzer 80 detects a signal of sufficient strength, the cellular analyzer 80 so notifies the master relay controller 72, e.g., via the satellite modem 82 over an F2 voice channel. In one implementation, the master relay controller 72 responds to such notification by signalling the MTSO 12 with a request that the call be handed off to the satellite cell 56 on an F3 channel. The MTSO 12 in turn reallocates the call to an F3 channel and directs the mobile unit 2 to retune to that channel in a similar manner to that described above for a call initiation process.

It will be noted that in the implementation described here, the master relay controller 72 requests a handoff as soon as the signal strength at the satellite cell 56 exceeds a predetermined threshold level. This is in contrast to the conventional method in which handoff would not be requested until the signal strength at the master cell 54 dropped below a predetermined level, regardless of how strong the signal might be at the satellite cell 56.

On the other hand, handoff from the satellite cell 56 to the master cell 54 is accomplished in a variation on a conventional manner. That is, when the signal strength of a call being handled by the satellite cell 56 drops below a predetermined level, the satellite cell 56 notifies the MTSO 12 of that fact, whereupon the MTSO 12 broadcasts a "please listen for" signal, as described above. The satellite cell 56 may notify the MTSO 12 via the scan receiver 78 if the scan receiver 78 is suitably arranged, or the satellite transceiver 64 may include conventional equipment for accomplishing the notification.

It will be appreciated by those of skill in the art (who have the benefit of this disclosure) that this invention can be modified to be capable of application in other situations. For example, expanded coverage could be provided to a rural area by a system comprising one master cell surrounded by a plurality of satellite cells in a cluster arrangement. This approach would require the master cell to contain a relay unit such as described above for each satellite cell. It will be appreciated that fewer cell site equipment would be required if frequencies were reused in such an arrangement. Alternatively, expanded coverage might be provided by one master cell and a series of satellite cells configured in a daisy chain arrangement where each satellite cell relays signals to the next satellite cell by translating and repeating signalling channels. Still further alternative embodiments could be implemented using any combination of daisy chains and clusters.

It will also be appreciated that coverage expansion is not limited to rural areas. A satellite cell could be used to provide coverage to a "hole" in an existing service area. In this embodiment, one satellite cell would be surrounded by existing master cells; the satellite cell would be capable of transmitting and receiving translated channels to and from each of the master cells, as well as being capable of transmitting and receiving signals within the frequency set of each master cell.

It will likewise be apparent that the relay transceiver 60, relay translator 70, and master relay controller 72 need not be physically located at or even near the master cell 54 (although it will often be found to be convenient to locate these units at the master cell 54).

The foregoing description of the present invention has been directed to particular embodiments for purposes of explanation and illustration. It will be apparent, however, to those skilled in this art that many modifications and changes may be made without departing from the essence of the invention. It is the Applicant's intention in the following claims to cover all equivalent modifications and variations as fall within the scope of the invention.

What is claimed is:

1. A remote coverage system whereby a mobile telecommunications switching office receives an inbound signal transmitted on an F2 frequency set, from a radiotelephone mobile unit via a master cellular mobile radiotelephone cell, the master cell being located at a site having a predetermined coverage area, with the mobile unit being at a location outside said predetermined coverage area, comprising:

(a) a satellite transceiver having a coverage area encompassing the location of the mobile unit and configured to receive the inbound signal transmitted by the mobile unit on the F2 frequency set;

(b) a satellite translator configured to translate all inbound signals received by the satellite transceiver on the F2 frequency set and to simultaneously rebroadcast the signals on the F3 frequency set;

(c) a master relay transceiver located at the site of the master cell and configured to receive the inbound signal on the F3 frequency set; and (d) a master translator located at the site of the master cell and configured to receive the inbound signal from the master relay transceiver and to transmit it on the F2 frequency set.

2. The system of claim 1, wherein:

(a) said satellite transceiver includes a satellite receiver capable of receiving the signal transmitted by said mobile unit on said F2 frequency set;

(b) said satellite transceiver further includes a satellite transmitter capable of transmitting signals on said F3 frequency set;

(c) said satellite translator is configured to receive as an input all inbound signals received by the satellite receiver on the F2 frequency set and to simultaneously generate, as an output that is input to the satellite transmitter, corresponding signals for broadcast by the satellite transmitter on the F3 frequency set.

3. In a cellular mobile radiotelephone (CMR) system for handling a call between a mobile unit and a mobile telecommunications switching office (MTSO), said CMR system including a master CMR cell that is located at a master cell site and that is in communication with the MTSO, a coverage extending system comprising:

(a) a satellite transceiver having a coverage area encompassing the location of the mobile unit and configured to receive signals on the F2 frequency set;

(b) a satellite translator configured to rebroadcast on an F3 frequency set all signals received by the satellite transceiver on the F2 frequency set;

(c) a master relay transceiver located at the site of the master CMR cell that is in communication with the MTSO and is configured to receive signals on the F3 frequency set;

(d) said call having a signal strength at said satellite transceiver; and (e) a handoff controller configured to transmit a handoff signal to the MTSO upon detection of an increase of said signal strength above a threshold level.

* * * * *